Feb. 10, 1948.        E. H. LAND        2,435,718
PHOTOGRAPHIC PROCESS AND APPARATUS FOR SUBJECTING
A PHOTOGRAPHIC FILM TO A PROCESSING FLUID
Filed Jan. 11, 1946          2 Sheets-Sheet 1

INVENTOR.
Edwin H. Land
BY Donald L. Brown
Attorney

Feb. 10, 1948. E. H. LAND 2,435,718
PHOTOGRAPHIC PROCESS AND APPARATUS FOR SUBJECTING
A PHOTOGRAPHIC FILM TO A PROCESSING FLUID
Filed Jan. 11, 1946 2 Sheets-Sheet 2

INVENTOR.
Edwin H. Land
BY Donald L. Brown
Attorney

Patented Feb. 10, 1948

2,435,718

UNITED STATES PATENT OFFICE 2,435,718

PHOTOGRAPHIC PROCESS AND APPARATUS FOR SUBJECTING A PHOTOGRAPHIC FILM TO A PROCESSING FLUID

Edwin H. Land, Cambridge, Mass., assignor to Polaroid Corporation, Cambridge, Mass., a corporation of Delaware Application January 11, 1946, Serial No. 640,503

26 Claims. (Cl. 95—13)

This invention relates to photography and more particularly to camera apparatus.

One object of the present invention is to provide a novel apparatus for forming a positive print of the subject image of a photographically exposed film.

Another object of the present invention is to provide a novel apparatus for effecting the spreading of measured quantities of liquid between a pair of sheet materials.

A further object of the present invention is to provide a novel apparatus wherein a container, carrying a liquid suitable for use in forming a positive print of the subject image of a photographically exposed film, may be predeterminedly released to said film and to a carrying material for said positive print.

Still another object of the present invention is to provide a novel apparatus wherein a container, carrying a liquid suitable for use in forming a positive print of the subject image of a photographically exposed film, may be predeterminedly dispensed between said film and a carrying material for said positive print, and wherein said dispensed contained may be compressed for releasing and spreading said liquid therebetween for forming said positive print.

A still further object of the present invention is to provide a novel camera apparatus wherein: a photosensitive film is supplied; a photosensitive film may be photographically exposed; a liquid-carrying container may be predeterminedly dispensed between said film and a material suiable for carrying a positive photographic print; and wherein said dispensed container may be compressed for release and spreading of said liquid between said film and said material for forming said positive print.

Yet another object of the present invention is to provide a novel apparatus adapted to serve as an attachment mounted on a conventional camera and interchangeable with the camera back, or as a unitary apparatus mounted in a photographic dark-room, said apparatus embodying means for forming a positive print of the subject image of a photographically exposed film.

A still further object of the present invention is to provide an apparatus comprising means for releasably retaining a liquid-carrying container, and for releasing said container and said carried liquid, and for spreading said liquid upon photographically exposed areas of a photosensitive film to develop said film, provide an image-forming component therein, and transport said component to a material compressed with said film for forming therein a positive print of the subject image of said exposed film.

Still another object of the present invention is to provide a novel camera apparatus wherein a film material comprising a plurality of photosensitive areas may be exposed, a material for carrying a plurality of positive prints of subject images of said exposed film may be supplied, a plurality of liquid-carrying containers may be predeterminedly dispensed to adjacent surfaces of said film and print-carrier material, and wherein said containers may be compressed between said film and print-carrier material for release and spreading of said liquid and formation of said plurality of positive prints.

Still further objects of the present invention are the provision: of a camera apparatus comprising a plurality of light-tight chambers for photographically exposing a photosensitive film and forming a positive print of the subject image of said exposed film, said chambers having access means for insertion or removal of said film and a material for carrying said positive print; of cutting means for severing predetermined lengths of said film and print-carrier material in operational assembly; of means for dispensing liquid-carrying containers to said film and print-carrier material; of means for compressing said film, liquid-carrying container, and positive print-carrier material; and of means for actuating said dispensing means and compressing means.

These and further objects of the invention will in part be obvious and will in part appear hereinafter.

The invention accordingly comprises the apparatus possessing the construction, combination of elements, and arrangement of parts which are exemplified in the apparatus hereinafter described, and the scope of the application of which will be indicated in the claims.

In the drawings, wherein like reference characters refer to like parts throughout the several views.

Figure 1:
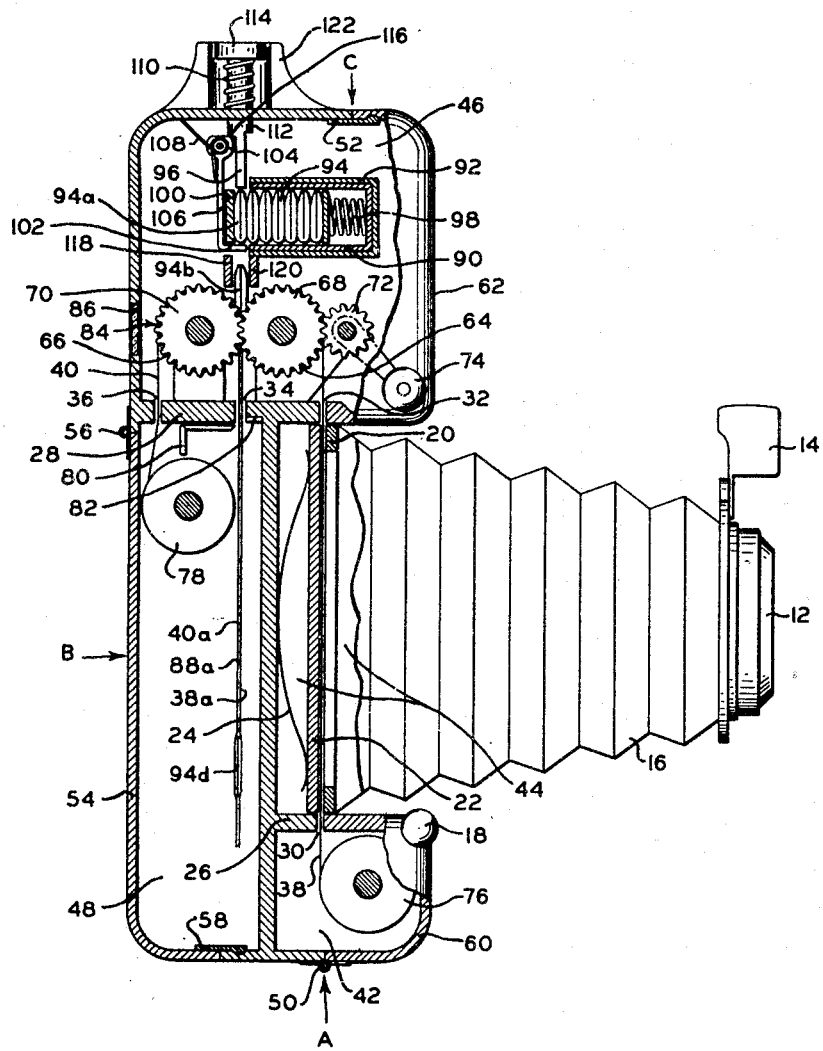
Figure 1 is an elevation view, partly in cross-section and with portions broken away, of one form of the novel camera apparatus of the invention.

Referring to Fig. 1, a camera apparatus is shown comprising both conventional elements for photographic exposure of a photosensitive film and novel elements of the invention, in operative relationship, said apparatus being designed for forming a positive print of a subject image to which said film may be exposed through a process comprising the release of a suitable liquid between said film and a carrying material for said positive print, and the spreading of said liquid over facing surfaces thereof by compressive means. Camera elements shown comprise lens and shutter 12, view finder 14, bellows 16, shutter release 18, framing plate 20, pressure plate 22 and pressure plate spring 24. A camera housing, suitable for supporting and enclosing the apparatus and for controlling the admittance or exclusion of actinic light to photosensitive film material, preferably comprises a plurality of external and internal walls, forming a plurality of light-tight chambers, said internal walls 26 and 28 having a plurality of apertures 30, 32, 34 and 36 extending therethrough for providing passages and guide means for the movement, within and between said chambers, of a photographic film 38 and a carrier or receiving layer for the aforesaid positive print as, for example, a paper strip material 40, and said apertures being provided with suitable light-shielding means as, for example, strips of a suitable fabric material, not shown, mounted adjacent said apertures. Within said chambers 42, 44, 46 and 48 may be performed the several stages of a photographic process comprising the supplying and photographic exposure of a photosensitive film and the formation of a positive print of the subject image of said exposed film, the aforesaid chambers being provided with acess means for inserting, removing or threading the film and other materials used in said camera apparatus, and chamber 46 containing in large part the novel apparatus of this invention. Access to chambers 42, 44, and 46 is obtained by swinging open external wall portions A, B, and C, as a unit, including all elements in chambers 46 and 48 and elements 22 and 24 in chamber 44, said wall portions pivoting on hinge 50 and the aforesaid movement being rendered possible by release of friction latch 52; access to chamber 48 is obtained by swinging open door 54 on hingle 56, said movement being rendered possible by release of friction latch 58. Housing portions 60 and 62 are rigidly interconnected by external wall portions, not shown, and by framing plate 20, extending therebetween, said housing portions 60 and 62 providing both external wall portions for the aforesaid light-tight chambers and support means for mounting camera bellows 16, shutter release 18, and a supply of film 38.

Within chamber 46 is mounted a pair of pressure rollers 64 and 66 having surfacing preferably of a suitable resilient material, the axes of said rollers lying in a substantially horizontal plane, as shown, and said rollers having rotative means comprising mutually engaged gears 68 and 70, pinion gear 72 and handcrank 74, the shaft bearing said pinion gear and handcrank preferably having unidirectional means for clockwise rotation, not shown, associated therewith. Mounted in chamber 42 is a spool 76 carrying a supply of photographic film 38, said film being led from spool 76, threaded across the aperture of framing plate 20, substantially half-around pressure roller 64, and passing into chamber 48. Mounted in chamber 48 is a spool 78 carrying a supply of a paper or other material 40 suitable for carrying or receiving a positive photographic print, said strip of paper being led from spool 78 into chamber 46, threaded substantially half-around pressure roller 66, and returned to chamber 48. Adjacent aperture 34 in chamber 48 is positioned a cutting device for severing lengths of said film and paper material after the passage of said materials through said aperture into chamber 48, said device comprising movable blade and handle 80 and fixed blade 82, said movable blade being pivotally mounted on wall 28 and being thus capable of effecting transverse severance of said film and paper materials upon their passage through aperture 34 into chamber 48.

It will be understood that operative movement of the aforesaid film and paper strip is actuated by rotation of handcrank 74 and pinion gear 72 in a clockwise direction, said rotation causing pressure roller gears 68 and 70 and associated pressure rollers 64 and 66 to rotate in counter-clockwise and clockwise directions, respectively. Suitable indicia for indicating the positioning of a frame of film for photographic exposure across framing plate 20, may be printed during manufacture on a surface of paper material 40 and, assuming said indicia to be spaced at intervals of said paper strip equal to intervals between said photographically exposable frames of film, and said film and paper material to be threaded in the camera apparatus in correct interrelationship by means of suitable leaders attached thereto, the aforesaid indicia, when arriving at position 84 by means of the aforesaid rotation of handcrank 74, may be observed through viewing window 86, said window preferably having a mark etched thereon for the purpose of obtaining alignment and, accordingly, positioning of the film for exposure, as above described, may be ascertained thereby.

Film and paper strip materials, in passing through pressure rollers 64 and 66, are suitably disposed for the introduction therebetween of a liquid, as, for example, a viscous liquid capable of permeating and reacting upon said film to develop a latent negative photographic image and produce an image-forming component therein, and of transporting said image-forming component to said paper material for production of a positive print therein and/or thereupon. The aforesaid pressure rollers, in addition to performing the hereinbefore-described function of propelling the film and paper material, are adapted to compress said materials and likewise to compress a liquid container dispensed therebetween, said container, releasably carrying a predetermined quantity of said liquid, and said release being effected by collapse of the container, as through an application of compressive stress from said rotated pressure rollers. Upon release of the aforesaid liquid between facing surfaces of film and strip material in the above-described manner, said viscous liquid may be spread in a substantially constant thickness over both the photographically exposed frame area of film and a similar area of the facing paper strip, said spreading operation being effected through continued rotation of the pressure rollers after release of said liquid. A container 94d is represented in Fig. 1 as having passed between the pressure rollers and having been collapsed therebetween and viscous liquid 88a is shown as having been spread over facing surfaces of film and paper strip, said materials having been substantially laminated during the process and being thereby in correct juxtapositional relationship for the aforesaid process of forming a positive print.

Within chamber 46 is shown one form of mechanism for dispensing liquid-carrying containers between the aforesaid film and paper strip, upon entrance of said materials to the pressure rollers. Said container dispensing means comprises a magazine 90 inserted in a magazine-holder 92, said magazine-holder being rigidly attached to the camera housing and said magazine being replaceable upon exhaustion of its contents. Within said magazine is a supply of containers 94, containing a liquid composition adapted to carry out the hereinbefore-described photographic process, said containers being formed from materials substantially impervious both to oxygen and to the contained liquid such as a foil material, coated as may be necessary, and having an outer covering or sheath suitable for undergoing deformation between the pressure rollers but of sufficient rigidity for preventing any alteration of container form when said containers are subjected to a thrusting pressure at their extremities as, for example, by the contact therewith of plunger portion 96. The aforesaid containers are biased toward release position in said magazine by compression spring 98, it being understood that after loading the magazine in the magazine-holder a holding plate, not shown, may be withdrawn for permitting said release of the containers from said magazine. One of said containers 94a is shown thus released from magazine 90 and in position for propulsion to the film and strip material during passage of said materials between the pressure rollers, said container being held in position by stop 100, rigidly fixed as, for example, to magazine-holder 92, and by detent means 102, said last-named means being interconnected with cam means 104 by arm 106. Coil spring 108 operates to turn cam 104 in a counterclockwise direction and thus provides said detent means with a tendency to assume the position shown when the plunger is in idle position. Said plunger has a shaft portion thereof extending through a bushing in the camera wall, is returned to idle position by spring 110, maintained in said position by stop 112, and is actuated by manual depression of button 114 against the action of said spring 110, thus moving cam-actuator portion 116 of the plunger and container-driving portion 96 of said plunger both to permit and motivate, respectively, propulsion of a liquid-carrying container between the aforesaid film and paper strip, proper positioning of the container being facilitated by guide elements 118 and 120, rigidly fixed to magazine-holder 92, and a container 94b being shown as having been thus positioned.

A guard element 122 for plunger button 114 may be provided and, as shown, partially encloses those portions of the plunger means external of the camera wall, said guard permitting access to said plunger button from one side. A more complete enclosure of said plunger button, during periods when the camera is not in use may be effected by an additional hinged or otherwise movably-attached guard portion, not shown, which may be opened when the camera is in operation.

With respect to feeding of the aforesaid containers to film and strip material in such manner as will insure that the liquid contained therein will be dispensed to said materials substantially immediately prior to entrance of the aforementioned photographically exposed frame of film between the rollers, so that said liquid may be spread over said frame and equivalent area of facing paper strip, it will be understood that means are provided whereby the operator of the camera, while moving the film and paper strip by means of handcrank 74, is permitted to ascertain that position of the film suitable for dispensal of a container thereto. Said means may, for example, comprise indicia for the purpose printed on the strip of paper material 40 and visible through viewing window 86, it being understood that, in the illustration shown, said indicia is in addition to that printed on the paper for framing the film for photographic exposure although the design of materials and components could be such that single index means would serve the dual purpose of predetermining both exposure position and container dispensing position of the film.

Figure 2:
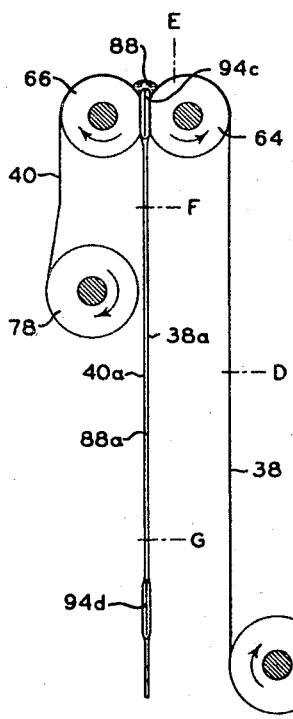
Fig. 2 is a somewhat schematic, fragmentary view of elements in Fig. 1, showing the function of said elements during operation of the apparatus.

In Fig. 2 are illustrated, somewhat schematically, elements of Fig. 1 related to the movement and compression of a photographically exposed film and a print-carrier material, said elements being shown in rotary movement as by reason of the clockwise rotation of handcrank 74 of Fig. 1, said operations being accompanied by movement both of film 38 and paper strip 40 from supply spools 76 and 78, respectively, to pressure rollers 84 and 86 and by compression of said materials between said rollers. Portion D, E of film 38 represents a photographically exposed frame thereof in movement, the emulsion bearing surface of said portion and a similarly-dimensioned surface portion of paper strip 40 being shown as moving toward a facing relationship and undergoing reception of viscous liquid 88, said liquid having been dispensed from partially collapsed container 94c, said container having been positioned by means previously described with reference to Fig. 1, and said liquid release having been effected by compression applied to the container by the aforesaid pressure rollers. It will accordingly be apparent that liquid 88 is undergoing directional release for spreading over said surface areas of film and strip material, it being understood that an appropriate supply of said liquid, relative to the compressive properties of the rollers is provided for the purpose. Portion F, G of film and paper materials represents a length of said materials having previously passed between the pressure rollers, and having liquid 88a spread in the form of a coating therebetween, said liquid having been dispensed to facing surfaces of film 38a and paper strip 40a by the collapse of container 94d between the aforesaid pressure rollers and said materials 38a and 40a being substantially laminated by reason of said liquid spread therebetween and said compressive force applied thereto.

Cross-referring to Figs. 1 and 2, it will be noted that the position of laminated film 38a and paper strip 40a is substantially within chamber 48, said chamber providing a light-tight enclosure wherein the process of positive print formation may occur. Door 54 provides access means to said chamber for use upon completion of said print-forming process whereby severance of lengths of said laminated materials by means of cutting blades 80 and 82 and removal of said severed materials from said chamber for the purpose of viewing a positive print formed within said materials may be performed. It is to be understood that means for determining proper position of the film and paper strip for severance thereof are provided, said means comprising, for example, either indicia solely for the purpose printed on strip 40 and visible through viewing window 86 or a design of propulsive elements of the apparatus such that, when a given frame of film is in position for exposure, another preceding frame of said film, previously exposed and laminated to the print-carrier material, is automatically in position for severance, in which last-named instance, a single index could serve for establishing correct positions of both frame portions simultaneously. It is further to be understood that movable cutting blade 80 may have a handle portion extending through the outer housing of the camera whereby access to chamber 48 is not required for cutting the laminated strip materials, or that a movable blade may be operatively connected to pressure roller driving means whereby said blade automatically severs said laminated materials at predetermined intervals.

Figure 3:
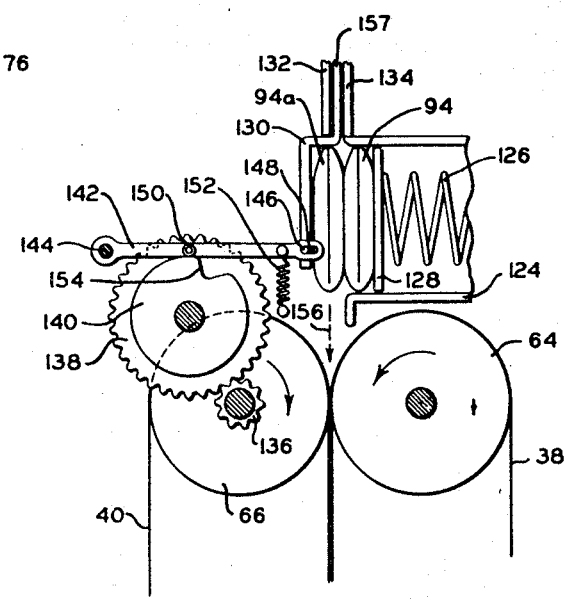
Fig. 3 is an elevation view of a modification of the mechanism for supplying the liquid-carrying containers shown in Fig. 1.

In Fig. 3, a modification of the mechanism in Fig. 1 for feeding liquid-carrying containers between film and positive print-carrier strip is shown. Said mechanism, suitable for positioning in chamber 46 of Fig. 1 and for association with pressure rollers 64 and 66, may, accordingly, be actuated, through the gearing shown in Fig. 1, by rotation of handcrank 74 and said mechanism provides means for feeding containers in a manner whereby each container is automatically introduced between the aforesaid materials, for directional release of the contained liquid, immediately prior to passage of a photographically exposed frame of film between the pressure rollers. A supply of containers 94 is releasably provided in a magazine 124 suitable for insertion in a magazine-holder similar to magazine-holder 92 of Fig. 1, initial release of a container being effected by the action of compression spring 126 against pressure plate 128 and by removal from said magazine of a holding-plate, not shown, whereby a container 94a is brought to a position in contact with plunger portion 130. Said plunger element is capable of being driven in a direction toward a plane cutting the axes of the aforesaid pressure rollers, the direction of plunger travel, as shown, being substantially perpendicular to said plane and said direction of travel being established by guides 132 and 134, rigidly fixed to the magazine-holder or to the camera housing. Maintenance of container 94a in the position shown is effected by frictional contact of said container both with container 94 and with plunger portion 130 it being understood that supplementary means for the purpose may comprise a device similar to detent means 102 of Fig. 1 or that containers may have a moderately adhesive material coated on adjacent surfaces thereof, adhesion therefrom being sufficient to prevent gravitational displacement of container 94a from the position shown. It being understood that the rotatable elements shown are mounted in bearings in either the camera housing or in a frame structure thereof not included in the drawing, gear 136, rigidly attached to the shaft of pressure roller 66, and said roller being driven in a clockwise direction, drives gear 138 and cam 140, rigidly fixed thereto, in a counterclockwise direction. Arm 142, rotatable about fixed pivot 144 and attached to plunger portion 130 by means of plunger pin 146 and arm slot 148, has roller element 150 attached thereto, said roller being maintained in contact with the periphery of cam 140 by means of spring 152, and said spring being attached respectively to arm 142 and to the camera housing or frame structure. Cam 140 has a constant radius excepting for peripheral depression 154, and upon rotation of said cam to a position where roller 150 enters said peripheral depression, arm 142 is actuated to rotate in a clockwise direction about pivot 144 being thus motivated by tension applied by spring 152. Said movement causes slot portion 148 of said arm to describe an arc toward the axial plane of pressure rollers 64 and 66, and serves to draw plunger portion 130 downward toward said plane, a movement of the plunger in a direction substantially perpendicular relative to said plane being permitted by the ability of arm 142 to move horizontally with respect to plunger pin 146 by means of slot 148. Said downward movement of plunger portion 130 causes container 94a to move in the direction of arrow 156 toward film 38 and paper strip 40, while said materials are undergoing propulsion and compression between pressure rollers 64 and 66 and plunger portion 157, moving downward, serves to maintain container 94 within magazine 124. It will be understood that the tension applied by spring 152 is sufficient for the purpose of thus propelling a container and that the ratio of gear 136 with respect to gear 138 is such as to cause said downward movement of plunger element 130 at proper intervals relative to the approach of a photographically exposed portion of film 38 toward the pressure rollers. As hereinbefore described, the liquid carried in each container is designated for release to and spreading over a photographically exposed frame of film and an equivalent facing portion of paper strip material. Accordingly, feeding of a container for effecting proper liquid release therefrom may be obtained through establishment of a correct ratio of gear 136 to gear 138, said ratio being predetermined with respect to the measurement between exposable frames of film. After positioning a container between said film and strip material, the plunger is caused to return to the position shown in Fig. 3 by continued rotation of cam 140, said rotation causing roller 150 to leave cam depression 154 and return to the extreme radius of said cam, arm 142 being thereby caused to rotate in a counterclockwise direction about pivot 144 and to elevate and carry plunger pin 146 and plunger portions 130 and 157 in an upward direction. Upon maximum elevation being obtained by the plunger, as determined by the extreme radius of cam 140, and upon plunger portion 157 returning to the position shown, a container is ejected from magazine 124 and assumes the position of container 94a in the illustration.

In the process of positive print formation illustrated in Figs. 1 and 2, film 38a and strip material 40a, interposed by liquid 88a, are shown in operational assembly therefor. Relative to said process of forming a positive print, it is required that said assembly be maintained for a predetermined period of time and that during said period actinic light be prevented from striking photosensitive materials as, for example, the film emulsion. Upon completion of the positive print, film and print-receiving layer materials may be stripped apart for viewing said print. Light-tight chamber 48 wherein said materials may be retained during said period of required assembly provides one means for the purpose but alternate means for protectively enclosing said photosensitive materials may be utilized, said means permitting a reduction in number of the plurality of light-tight chambers illustrated in the drawings and comprising, for example, the provision of an opaque receiving or carrier material for the positive print and an opaque backing material for the photosensitive film whereby said materials, in operational assembly and in properly severed lengths may be emitted directly from the camera apparatus and subsequently stripped apart for viewing the completed print.

While the camera apparatus shown in the drawings represents an inclusive apparatus for performing the functions of exposing a photosensitive film to a subject image and for forming a positive print of said subject image, it is to be understood that elements of the apparatus more particularly serving said positive print-forming function may be housed in the form of an attachment, interchangeable with the back of a conventional camera, or that said elements may be suitably mounted apart from the camera, in a photographic dark-room for use in conjunction with a photographically exposed film. Operation of apparatus is not restricted to compressive and propulsive means of the type shown, it being apparent that other means than those illustrated could serve a similar function. Possible modifications of the apparatus for propelling and compressing the aforesaid materials comprise, for example, a plurality of endless belts capable of applying compression and propulsion between their surfaces. Separate elements for applying compression to the film and print-carrier material may be used in conjunction with propulsive means as, for example, individual pairs of pressure rollers for each function or wedge- or segment-like elements, or pressure plate means operatively synchronized with said propulsive means. Where pressure roller or other of the abovementioned means are employed, operation thereof is not necessarily limited to manually applied power. The rollers of Fig. 1 or the rollers and associated mechanism for feeding liquid-carrying containers, shown in Fig. 3, may be power driven as, for example, by a spring motor having releasable detent means for applying power and for controlling the duration of said applied power. It will be apparent that the mechanisms shown for releasably retaining, releasing, and dispensing containers are but examples of many possible means for accomplishing similar purposes. One modification thereof could comprise means for ejecting liquid-carrying containers from a mechanism whereby each ejected container is both relieved of the pressure causing said ejection and is rendered substantially free from frictional restraint which may prevail due to contact with other containers or elements of the mechanism. Under said condition of freedom from frictional contact said container would be particularly suitably disposed for propulsion to film and print-carrier material as, for example, by means such as those shown in Fig. 1, or for introduction to said materials under the influence of gravity alone. While the type of film utilized in conjunction with the apparatus of this invention is shown to be roll film, it is to be understood that means for dispensal of a liquid-carrying container to predetermined portions of a photosensitive film and a print-carrier material and compressive and propulsive means substantially similar to those shown could be adapted to use with cut film supplied, for example, from a film pack.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. Photographic apparatus for exposing and processing a photographic sheet material comprising a photosensitive layer as a stratum thereof, said apparatus comprising, in combination, means for supplying said photographic sheet material, means for supplying another sheet-like material, means for photoexposing a predetermined area of said photosensitive layer, means comprising a pair of pressure applying members between which said sheet materials are moved in superposed relationship and compressed, means for holding a container free of said sheet materials, said container having sealed therein a liquid for the processing of said photosensitive layer, means associated with said container holding means for effecting the release of said container from said holding means, and means for mounting said container holding means and said pressure applying members with respect to one another so that said container, upon release from said container holding means, is caused to contact at least one of said sheet materials, adjacent said pressure applying members, and to be pressed by said pressure applying members between both of said sheet materials upon relative movement of said sheet materials and said pressure applying members, said pressure applying members acting to release the processing fluid from said container and to spread said fluid throughout predetermined interface areas of said sheet materials.

2. Apparatus for photographically exposing a light-sensitive film material and for processing the exposed portion of said film in cooperation with another sheet-like material, wherein a fluid container releasably carrying a film processing fluid is employed, said apparatus comprising, in combination, casing means for enclosing elements of said apparatus, means for photographically exposing said film material, a pair of pressure applying members between portions of which said materials and fluid container are positioned in superposed relationship and subjected to compression, means for releasably mounting a supply of said film material and for guiding said film from a position adjacent said exposing means to a position adjacent said pressure applying members, means for releasably mounting a supply of said other material substantially adjacent said pressure applying members, and magazine means for holding a plurality of said fluid containers out of contact with said materials, said magazine having associated therewith means for individually dispensing said containers therefrom, said pressure applying members being so mounted relative to said dispensing means that each container is positioned, upon dispensation, between said materials for compression by said members, said compression causing release of the processing fluid carried by said container between said materials.

3. Apparatus for photographically exposing a light-sensitive film material and for processing the exposed portion of said film in cooperation with another sheet-like material, wherein a fluid container releasably carrying a film processing fluid is employed, said apparatus comprising, in combination, means for photographically exposing said film material, a pair of pressure applying members between portions of which said materials and fluid container are positioned in superposed relationship and subjected to compression, means for releasably mounting a supply of said film material and for guiding said film from a position adjacent said exposing means to a position adjacent said pressure applying members, means for releasably mounting a supply of said other material substantially adjacent said pressure applying members, magazine means for holding a plurality of said fluid containers out of contact with said materials, said magazine having associated therewith means for individually dispensing said containers therefrom, said pressure applying members being so mounted relative to said dispensing means that each container is positioned, upon dispensation, between said materials for compression by said members, said compression causing release of the processing fluid carried by said container between said materials, means forming a chamber for enclosing said pressure applying members, a wall of said chamber comprising a light-shielded aperture adapted to have said compressed materials passed therethrough, said aperture providing access to said materials, and severance means mounted adjacent said aperture for severing portions of said materials.

4. Apparatus for photographically exposing a light-sensitive film material and for processing the exposed portion of said film in cooperation with another sheet-like material, wherein a fluid container releasably carrying a film processing fluid is employed, said apparatus comprising, in combination, means for photographically exposing said film material, a pair of pressure applying members between portions of which said materials and fluid container are positioned in superposed relationship and subjected to compression, means for releasably mounting a supply of said film material and for guiding said film from a position adjacent said exposing means to a position adjacent said pressure applying members, means for releasably mounting a supply of said other material substantially adjacent said pressure applying members, magazine means for holding a plurality of said fluid containers out of contact with said materials, said magazine having associated therewith means for individually dispensing said containers therefrom, said pressure applying members being so mounted relative to said dispensing means that each container is positioned, upon dispensation, between said materials for compression by said members, said compression causing release of the processing fluid carried by said container between said materials, means forming a light-tight chamber for enclosing said pressure applying members, means forming a second light-tight chamber adapted to hold said compressed materials free from actinic light for a predetermined period, a common wall of said chambers being formed by a web adapted to mounting of said pressure applying members thereon, said web comprising a light-shielded aperture formed therein adapted to have said compressed materials passed therethrough from said first-named chamber to said second-named chamber, severance means mounted adjacent said aperture for severing portions of said materials, and means associated with said second-named chamber for providing access to said severed materials.

5. Apparatus for photographically exposing a light-sensitive film material and for processing the exposed portion of said film in cooperation with another sheet-like material, wherein a fluid container releasably carrying a film processing fluid is employed, said apparatus comprising, in combination, casing means for enclosing elements of said apparatus, means for holding said film material in the focal plane of the apparatus and for photographically exposing said film material, a pair of rotatable members between which said materials and fluid container are positioned in superposed relationship and subjected to compression, means for releasably mounting a supply of said film material comprising a plurality of exposable areas and for guiding said film from a position adjacent said exposing means to said rotatable members, means for releasably mounting a supply of said other material substantially adjacent said rotatable members, said other material comprising a plurality of areas coextensive with said areas of film and adapted to superposition with said areas of film after removal of the latter from said position adjacent said exposure means, and magazine means for holding a plurality of said fluid containers out of contact with said materials, said magazine having associated therewith means for individually dispensing said containers therefrom, said rotatable members being so mounted relative to said dispensing means that each container is positioned, upon dispensation, between said materials for compression by said members, said compression causing release of the processing fluid carried by said container between said materials.

6. Apparatus for photographically exposing a light-sensitive film material and for processing the exposed portion of said film in cooperation with another sheet-like material, wherein a fluid container releasably carrying a film processing fluid is employed, said apparatus comprising, in combination, means for photographically exposing said film material, a pair of rotatable members between which and by which said materials and said fluid container are advanced in superposed relationship and compressed, means for actuating said rotatable members, means for releasably mounting a supply of said film material comprising a plurality of exposable areas and for guiding said film from a position adjacent said exposing means to said rotatable members, means for releasably mounting a supply of said other material substantially adjacent said rotatable members, said other material comprising a plurality of areas coextensive with said areas of film and adapted to superposition with said areas of film, and magazine means for holding a plurality of said fluid containers out of contact with said materials, said magazine having associated therewith means for individually dispensing said containers therefrom, said rotatable members being so mounted relative to said dispensing means that each container is positioned, upon dispensation, between said materials for compression by said members, said compression causing release of the processing fluid carried by said container between said materials.

7. Apparatus for photographically exposing a light-sensitive film material and for processing the exposed portion of said film in cooperation with another sheet-like material, wherein a fluid container releasably carrying a film processing fluid is employed, said apparatus comprising, in combination, means for photographically exposing said film material, a pair of rotatable members, between which and by which said materials and said fluid container are advanced in superposed relationship and compressed, means for actuating said rotatable members, means for releasably mounting a roll of said film material comprising a plurality of exposable areas and for guiding said film from a position adjacent said exposing means to said rotatable members, means for releasably mounting a supply of said other material substantially adjacent said rotatable members, said other material comprising a plurality of areas coextensive with said areas of film and adapted to superposition with said areas of film, magazine means for holding a plurality of said fluid containers out of contact with said materials, said magazine having associated therewith means for individually dispensing said containers therefrom, said rotatable members being so mounted relative to said dispensing means that each container is positioned, upon dispensation, between said materials for compression by said members, said compression causing release of the processing fluid carried by said container between said materials, and severance means mounted adjacent said rotatable members for severing predetermined lengths of said compressed materials.

8. Apparatus for photographically exposing a light-sensitive film material and for processing the exposed portion of said film in cooperation with another sheet-like material, wherein a fluid container releasably carrying a film processing fluid is employed, said apparatus comprising, in combination, means for photographically exposing said film material, a pair of rotatable members between which and by which said materials and said fluid container are advanced in superposed relationship and compressed, means for releasably mounting a roll of said film material comprising a plurality of exposable areas and for guiding said film from a position adjacent said exposing means to said rotatable members, means for releasably mounting a roll of said other material substantially adjacent said rotatable members, said other material comprising a plurality of areas coextensive with said areas of film and adapted to superposition with said areas of film, magazine means for holding a plurality of said fluid containers out of contact with said materials, said magazine having associated therewith means for individually dispensing said containers therefrom, said rotatable members being so mounted relative to said dispensing means that each container is positioned, upon dispensation, between said materials for compression by said members, said compression causing release of the processing fluid carried by said container between said materials, severance means mounted adjacent said rotatable members for severing predetermined lengths of said compressed materials, and means exterior of said casing for actuating said rotatable members, said severance means, and said container dispensing means.

9. Apparatus for photographically exposing a light-sensitive film material and for processing the exposed portion of said film in cooperation with another sheet-like material, wherein a fluid container releasably carrying a film processing fluid is employed, said apparatus comprising, in combination, casing means for enclosing elements of said apparatus, means for positioning said film material in the focal plane of the apparatus and for photographically exposing said film material, a pair of rotatable members between which and by which said materials and said fluid container are advanced in superposed relationship and compressed, means for releasably mounting a roll of said film material comprising a plurality of exposable areas and for guiding said film from a position adjacent said exposing means to said rotatable members, means for releasably mounting a roll of said other material substantially adjacent said rotatable members, said other material comprising a plurality of areas coextensive with said areas of film and adapted to superposition with said areas of film after removal of the latter from said position adjacent said exposure means, magazine means for holding a plurality of said fluid containers out of contact with said materials, said magazine having associated therewith means for individually dispensing said containers therefrom, said rotatable members being so mounted relative to said dispensing means that each container is positioned, upon dispensation, between said materials for compression by said members, said compression causing release of the processing fluid carried by said container between said materials, severance means mounted adjacent said rotatable members for severing predetermined lengths of said compressed materials, means exterior of said casing for actuating said rotatable members, said severance means, and said container dispensing means, and means for establishing relative position and register of said materials and fluid containers within said apparatus.

10. Apparatus for photographically exposing a light-sensitive film material and for processing the exposed portion of said film in cooperation with another sheet-like material, wherein a fluid container releasably carrying a film processing fluid is employed, said apparatus comprising, in combination, casing means for enclosing elements of said apparatus, means for positioning said film material in the focal plane of the apparatus and for photographically exposing said film material, a pair of rotatable members between which and by which said materials and said fluid container are advanced in superposed relationship and compressed, means for releasably mounting a roll of said film material comprising a plurality of exposable areas and for guiding said film from a position adjacent said exposing means to said rotatable members, means for releasably mounting a roll of said other material substantially adjacent said rotatable members, said other material comprising a plurality of areas coextensive with said areas of film and adapted to superposition with said areas of film after removal of the latter from said position adjacent said exposure means, magazine means for holding a plurality of said fluid containers out of contact with said materials, said magazine having associated therewith means for individually dispensing said containers therefrom, said rotatable members being so mounted relative to said dispensing means that each container is positioned, upon dispensation, between said materials for compression by said members, said compression causing release of the processing fluid carried by said container between said materials, severance means mounted adjacent said rotatable members for severing predetermined lengths of said compressed materials, and means for interlocking said rotatable members and said fluid container dispensing means to dispense each fluid container to said materials at a predetermined stage of advancement thereof.

11. The photographic process of treating a surface of a light-sensitive film material, comprising a photographically exposed portion thereof, to obtain a predetermined treatment of said exposed portion, which comprises positioning said film surface and a surface of another sheet-like material in adjacent relation, positioning a fluid container which releasably holds a supply of processing fluid between said film and said other material substantially adjacent and to one side of said exposed film portion, and progressively subjecting both materials to compression by relative movement of the materials and a suitable compressing means to provide release of said fluid from the container and spreading of the fluid between said surfaces, said compression commencing at adjacent portions of the materials between which the fluid container is positioned and proceeding across the materials to include at least said exposed portion of film and an area of said other sheet-like material which is coextensive with said exposed film portion.

12. The photographic process of treating a surface of a light-sensitive film material, comprising a photographically exposed portion thereof, which comprises positioning said film surface and a surface of another sheet-like material in adjacent relation, placing a fluid container which releasably holds a supply of processing fluid upon a portion of at least one of said surfaces located substantially adjacent and to one side of said exposed film portion, and progressively subjecting both materials to compression by relative movement of the materials and a suitable compressing means to provide, in sequence, release of said fluid from the container, and spreading of the fluid between said surfaces, said compression commencing at adjacent portions of the materials between which the fluid container is positioned and proceeding across the materials to include at least said exposed portion of film and an area of said other sheet-like material which is coextensive with said exposed film portion.

13. The photographic process of treating a surface of a light-sensitive film material, comprising a photographically exposed portion thereof, which comprises positioning an area of said film surface and an area of a surface of another sheet-like material in adjacent relation between a suitable compressing means, while other areas of said surfaces are maintained in spaced relation to the compressing means, placing a fluid container which releasably holds a supply of film processing fluid in frictional contact with a portion of at least one of said surface areas which is in said spaced relation to the compressive means and which is located substantially adjacent and to one side of said exposed film portion, and progressively subjecting both materials to compression by relative movement of the materials and of said compressing means to provide, in sequence, release of said fluid from the container and spreading of the fluid between said surfaces, said compression commencing at adjacent portions of the materials between which the fluid container is positioned and proceeding across the materials to include at least said exposed portion of film and an area of said other sheet-like material which is coextensive with said exposed film portion.

14. The photographic process of treating a surface of a light-sensitive film material, comprising a photographically exposed portion thereof, which comprises the step of positioning said film surface and a surface of another sheet-like material in adjacent relation, the step of placing a collapsible capsule-like fluid container, releasably holding a supply of processing fluid upon a portion of at least one of said surfaces, said portion being located substantially adjacent and to one side of said exposed film portion, and said container being of a type formed for extending along an entire side of said exposed film portion and for release of its fluid contents thereto when collapsed, and the step of progressively subjecting both materials to compression by relative movement of the materials and a suitable compressing means to provide, in sequence, release of said fluid from the container and spreading of the fluid between said surfaces, said compression commencing at adjacent portions of the materials between which the fluid container is positioned and proceeding across the materials to include at least said exposed portion of film and an area of said other sheet-like material which is coextensive with said exposed film portion.

15. The photographic process of treating a surface of a light-sensitive film material, comprising a photographically exposed portion thereof, which comprises positioning said film surface and a surface of another sheet-like material in adjacent relation, positioning a fluid container which releasably holds a supply of processing fluid between said film and said other material substantially adjacent and to one side of said exposed film portion, and progressively subjecting both materials to compression by continuously moving the materials between suitable compressive surfaces in a direction whereby adjacent portions of the materials between which the fluid container is positioned are first subjected to compression to provide release of said fluid therefrom and succeeding portions of the materials, are subsequently subjected to compression for spreading the fluid between, and in contact with, said adjacent surfaces of the materials, comprising the exposed portion of film.

16. Photographic apparatus comprising, in combination, means for mounting a supply of photosensitive material which is to be subjected to a predetermined processing, means for mounting a supply of another sheet material, means for holding a plurality of containers and for predeterminedly dispensing the same, each container carrying a processing fluid for processing said photosensitive material, and means between parts of which said photosensitive material and said sheet material are capable of being fed in face-to-face relationship, said parts engaging opposite faces of said superposed sheet materials to press the same in the direction of one another, said container dispensing means and said pressure applying means being so located relative to each other that each container, upon dispensation, is positioned between said materials for compression by said pressure applying means, said compression releasing and spreading the contents of said container between said materials for processing said photosensitive material.

17. Photographic apparatus comprising, in combination, means for mounting a supply of photosensitive material which is to be subjected to a predetermined processing, means for mounting a supply of another sheet material, means for holding a plurality of containers and for predeterminedly dispensing the same, each container carrying a processing fluid for processing said photosensitive material, means between parts of which said photosensitive material and said sheet material are capable of being fed in face-to-face relationship, said parts engaging opposite faces of said superposed sheet materials to press the same in the direction of one another, said container dispensing means and said pressure applying means being so located relative to each other that each container, upon dispensation, is positioned between said materials for compression by said pressure applying means, said compression releasing and spreading the contents of said container between said materials for processing said photosensitive material, and means responsive to the movement of at least one of said sheet materials with respect to said pressure applying means for controlling the operation of said container dispensing means so that said container when dispensed is located between said materials in a predetermined relation to a given area of said photosensitive material.

18. Photographic apparatus comprising, in combination, means for mounting a supply of photosensitive material which is to be subjected to a predetermined processing, means for mounting a supply of another sheet material, means for holding a plurality of containers and for predeterminedly dispensing the same, each container carrying a processing fluid for processing said photosensitive material, and means comprising a pair of pressure applying members between which said photosensitive material and said sheet material are capable of being fed in face-to-face relationship, said members engaging opposite faces of said superposed sheet materials to press the same in the direction of one another, one of said pressure applying members being a pressure roller, said container dispensing means and said pressure applying means being so located relative to each other that each container, upon dispensation, is positioned between said materials for compression by said pressure applying means, said compression releasing and spreading the contents of said container between said materials for processing said photosensitive material.

19. Photographic apparatus comprising, in combination, means for mounting a supply of photosensitive material which is to be subjected to a predetermined processing, means for mounting a supply of another sheet material, means for holding a plurality of containers and for predeterminedly dispensing the same, each container carrying a processing fluid for processing said photosensitive material, means comprising a pair of pressure rollers between which said photosensitive material and said sheet material are capable of being fed in face-to-face relationship, said rollers engaging opposite faces of said superposed sheet materials to press the same in the direction of one another, said container dispensing means and said pressure applying means being so located relative to each other that each container, upon dispensation, is positioned between said materials for compression by said pressure applying means, said compression releasing and spreading the contents of said container between said materials for processing said photosensitive material, and means for rotating said pressure rollers to cause the same to advance said sheet materials therebetween while applying compression thereto.

20. Photographic apparatus comprising, in combination, means for mounting a supply of photosensitive material which is to be subjected to a predetermined processing, means for mounting a supply of another sheet material, means for holding a plurality of containers and for predeterminedly dispensing the same, each container carrying a processing fluid for processing said photosensitive material, means comprising a pair of pressure rollers between which said photosensitive material and said sheet material are capable of being fed in face-to-face relationship, said rollers engaging opposite faces of said superposed sheet materials to press the same in the direction of one another, said container dispensing means and said pressure applying means being so located relative to each other that each container, upon dispensation, is positioned between said materials for compression by said pressure applying means, said compression releasing and spreading the contents of said container between said materials for processing said photosensitive material, means for rotating said pressure rollers to cause the same to advance said sheet materials therebetween while applying compression thereto, and means responsive to the rotation of said pressure rollers for actuating the operation of said container dispensing means so that said container, when dispensed, is located between said materials in a predetermined relation to a given area of said photosensitive material.

21. Photographic apparatus comprising, in combination, means for mounting a supply of photosensitive material, means for mounting a supply of another sheet material, means for photoexposing a predetermined area of said photosensitive material, means for releasably holding a container, said container carrying a processing fluid for said photosensitive material, and means between parts of which said photosensitive material and said sheet material are capable of being fed in face-to-face relationship and of being pressed together after exposure of said photosensitive material, said container holding means and said pressure applying means being so mounted in said apparatus relative to each other that said container, upon being released from said holding means, is positioned between said materials for compression by said pressure applying means, said compression releasing and spreading the contents of said container between said materials for processing said photosensitive material.

22. Photographic apparatus comprising, in combination, means for mounting a supply of photosensitive material, means for mounting a supply of another sheet material, means for photoexposing successive areas of said photosensitive material, means for holding a plurality of containers and for predeterminedly dispensing the same, each said container carrying a processing fluid for processing at least one of said areas of said photosensitive material, and means comprising a pair of pressure applying members between which said photosensitive material and said sheet material are capable of being fed in face-to-face relationship and of having each exposed area of said photosensitive material superposed with a corresponding area of said sheet material and subjected to compression, said container dispensing means and said pressure applying means being so mounted in said apparatus relative to each other that each said container, upon dispensation, is positioned between said materials for compression by said pressure applying means, said compression releasing and spreading the contents of said container between said materials for processing.

23. Photographic apparatus comprising, in combination, means for mounting a supply of photosensitive material, means for mounting a supply of another sheet material, means for photoexposing successive areas of said photosensitive material, means for holding a plurality of containers and for predeterminedly dispensing the same, each said container carrying a processing fluid for processing at least one of said areas of said photosensitive material, means comprising a pair of pressure applying members between which said photosensitive material and said sheet material are capable of being fed in face-to-face relationship and of having each exposed area of said photosensitive material superposed with a corresponding area of said sheet material and subjected to compression, said container dispensing means and said pressure applying means being so mounted in said apparatus relative to each other that each said container, upon dispensation, is positioned between said materials for compression by said pressure applying means, said compression releasing and spreading the contents of said container between said materials for processing, and means for controlling the operation of said container dispensing means in relation to the movement of said photosensitive sheet material so that each container, upon dispensation, is located between said materials adjacent one of said exposed areas of said photosensitive material.

24. Photographic apparatus comprising, in combination, means for mounting a supply of photosensitive material, means for mounting a supply of another sheet material, means for photoexposing successive areas of said photosensitive material, means for holding a plurality of containers and for predeterminedly dispensing the same, each said container carrying a processing fluid for processing at least one of said areas of said photosensitive material, means comprising a pair of pressure applying rollers between which said photosensitive material and said sheet material are capable of being fed in face-to-face relationship and of having each exposed area of said photosensitive material superposed with a corresponding area of said sheet material and subjected to compression, said container dispensing means and said pressure applying means being so mounted in said apparatus relative to each other that each said container, upon dispensation, is positioned between said materials for compression by said pressure applying means, said compression releasing and spreading the contents of said container between said materials for processing, means for actuating the operation of said container dispensing means in relation to the movement of said photosensitive sheet material so that each container, upon dispensation, is located between said materials adjacent one of said exposed areas of said photosensitive material, and means for rotating said rollers to cause the same to advance said sheet materials therebetween while applying compression thereto.

25. Photographic apparatus comprising, in combination, means for mounting a supply of photosensitive material, means for mounting a supply of another sheet material, means for photoexposing successive areas of said photosensitive material, means for holding a plurality of containers and for predeterminedly dispensing the same, each said container carrying a processing fluid for processing at least one of said areas of said photosensitive material, means comprising a pair of pressure applying members between which said photosensitive material and said sheet material are capable of being fed in face-to-face relationship and of having each exposed area of said photosensitive material superposed with a corresponding area of said sheet material and subjected to compression, said container dispensing means and said pressure applying means being so mounted in said apparatus relative to each other that each said container, upon dispensation, is positioned between said materials for compression by said presssure applying means, said compression releasing and spreading the contents of said container between said materials for processing, means for controlling the operation of said container dispensing means in relation to the movement of said photosensitive sheet material so that each container, upon dispensation, is located between said materials adjacent one of said exposed areas of said photosensitive material, and means for severing predetermined lengths of said superposed sheet materials between which said processing fluid has been spread.

26. Photographic apparatus comprising, in combination, means for mounting a supply of photosensitive material, means for photoexposing successive areas of said photosensitive material, means for holding a plurality of containers and for predeterminedly dispensing the same, each said container carrying a processing fluid for processing at least one of said areas of said photosensitive material, means comprising a pair of pressure applying members between which said photosensitive material is capable of being fed, said container dispensing means and said pressure applying means being so mounted in said apparatus relative to each other that each container, upon dispensation, is positioned upon said photosensitive material for compression by said pressure applying means, said compression releasing and spreading the contents of said container over said photosensitive material to process the same, and means for controlling the operation of said container dispensing means in relation to the movement of said photosensitive sheet material so that each container, upon dispensation, is located adjacent one of said exposed areas of said photosensitive material, the contents of said container being spread throughout said area to process the same by the pressure applying means.

EDWIN H. LAND.

REFERENCES CITED

The following references are of record in the file of this patent:

UNITED STATES PATENTS

| Number | Name | Date |
|---|---|---|
| 1,424,816 | Grillone | Aug. 8, 1922 |

FOREIGN PATENTS

| Number | Country | Date |
|---|---|---|
| 470,197 | Great Britain | Aug. 11, 1937 |